(12) United States Patent
Park et al.

(10) Patent No.: US 12,417,768 B2
(45) Date of Patent: Sep. 16, 2025

(54) ELECTRONIC DEVICE AND UTTERANCE PROCESSING METHOD THEREOF

(71) Applicant: SAMSUNG ELECTRONICS CO., LTD., Suwon-si (KR)

(72) Inventors: Suneung Park, Suwon-si (KR); Sanghee Kim, Suwon-si (KR); Hyunju Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 18/108,859

(22) Filed: Feb. 13, 2023

(65) Prior Publication Data

US 2023/0267929 A1 Aug. 24, 2023

Related U.S. Application Data

(63) Continuation of application No. PCT/KR2022/020209, filed on Dec. 13, 2022.

(30) Foreign Application Priority Data

Feb. 18, 2022 (KR) .................. 10-2022-0019892
Mar. 17, 2022 (KR) .................. 10-2022-0033557

(51) Int. Cl.
*G10L 15/22* (2006.01)
*G10L 15/18* (2013.01)
(Continued)

(52) U.S. Cl.
CPC .......... *G10L 15/22* (2013.01); *G10L 15/1815* (2013.01); *G10L 15/30* (2013.01);
(Continued)

(58) Field of Classification Search
CPC .... G06F 3/167; G06F 16/3329; G06F 40/268; G06F 3/0484; G06F 40/295; G06F 40/30;
(Continued)

(56) References Cited

U.S. PATENT DOCUMENTS 6,871,179 B1 * 3/2005 Kist .................. G10L 15/26
704/235
8,326,637 B2 * 12/2012 Baldwin ................ G10L 15/22
704/7

(Continued)

FOREIGN PATENT DOCUMENTS

JP 2020118842 A 8/2020
JP 2020148805 A 9/2020
(Continued)

OTHER PUBLICATIONS

International Search Report (PCT/ISA/210) issued by the International Searching Authority on Mar. 20, 2023 in International Patent Application No. PCT/KR2022/020209.
(Continued)

*Primary Examiner* — Gerald Gauthier
(74) *Attorney, Agent, or Firm* — Sughrue Mion, PLLC

(57) ABSTRACT

An electronic device and an utterance processing method of the electronic device are provided. The electronic device includes a microphone that receives a first and a second utterance of a user, the second utterance being generated at a later point in time than the first utterance, a memory storing instructions, and at least one processor. The at least one processor may be configured to execute the instructions to extract a first domain corresponding to the first utterance and a first intent corresponding to the first utterance, determine a correlation between the first utterance and the second utterance, and determine whether to process the second utterance based on the correlation.

18 Claims, 12 Drawing Sheets

(51) Int. Cl.
*G10L 15/30* (2013.01)
*H04R 3/00* (2006.01)
*G10L 15/08* (2006.01)

(52) U.S. Cl.
CPC .......... *H04R 3/00* (2013.01); *G10L 2015/088* (2013.01); *G10L 2015/223* (2013.01)

(58) Field of Classification Search
CPC ................ G06F 40/40; G06Q 30/0201; G06Q 10/06311; G06Q 30/0273; G10L 13/08; G10L 15/00; G10L 15/02; G10L 15/14; G10L 15/1815; G10L 15/1822; G10L 15/22; G10L 15/26; G10L 15/30; G10L 2015/088; G10L 2015/223; G10L 15/063; G10L 15/193; G10L 15/197; H04R 3/00; H04R 2201/028; A61B 5/741; G06N 3/08; G06N 5/01; G06V 1/774; H04L 51/02
USPC ..... 704/257, 270.1, 275, 231, 240; 705/7.13
See application file for complete search history.

(56) References Cited

U.S. PATENT DOCUMENTS

| | | | |
|---|---|---|---|
| 8,688,453 B1* | 4/2014 | Joshi | G10L 15/00 |
| | | | 707/738 |
| 8,838,456 B2* | 9/2014 | Lee | G06F 3/167 |
| | | | 379/88.04 |
| 9,953,645 B2 | 4/2018 | Bak et al. | |
| 10,068,567 B1* | 9/2018 | Hermush | G06F 16/3329 |
| 10,515,637 B1* | 12/2019 | Devries | G10L 15/1822 |
| 10,614,800 B1* | 4/2020 | McMahon | G06F 3/0484 |
| 10,706,848 B1* | 7/2020 | Greene | G10L 15/30 |
| 11,450,315 B2 | 9/2022 | Kim et al. | |
| 2007/0244629 A1* | 10/2007 | Hirayama | G10L 15/22 |
| | | | 704/E15.04 |
| 2008/0167914 A1* | 7/2008 | Ikeda | G06Q 10/06311 |
| | | | 705/7.29 |
| 2008/0243498 A1* | 10/2008 | Poi | G10L 15/193 |
| | | | 704/E15.04 |
| 2008/0243499 A1* | 10/2008 | Poi | G10L 15/063 |
| | | | 704/E15.04 |
| 2010/0217604 A1* | 8/2010 | Baldwin | G06Q 30/0273 |
| | | | 704/E21.001 |
| 2013/0173267 A1* | 7/2013 | Washio | G10L 15/197 |
| | | | 704/240 |
| 2016/0336024 A1* | 11/2016 | Choi | G10L 15/22 |
| 2017/0011742 A1* | 1/2017 | Jing | G06F 40/268 |
| 2017/0178626 A1* | 6/2017 | Gruber | G10L 13/08 |
| 2018/0096680 A1* | 4/2018 | Lee | G10L 15/1815 |
| 2018/0233147 A1 | 8/2018 | Tukka et al. | |
| 2018/0261216 A1* | 9/2018 | Leeb | G10L 15/02 |
| 2018/0315427 A1* | 11/2018 | Kwon | G10L 15/1815 |
| 2019/0206405 A1* | 7/2019 | Gillespie | G06Q 30/0201 |
| 2019/0318724 A1* | 10/2019 | Chao | G10L 15/02 |
| 2019/0318735 A1* | 10/2019 | Chao | G10L 15/14 |
| 2019/0371329 A1* | 12/2019 | D'Souza | G10L 15/22 |
| 2020/0125603 A1* | 4/2020 | Ha | G10L 15/22 |
| 2020/0175973 A1* | 6/2020 | Bender | G06N 5/01 |
| 2020/0251098 A1* | 8/2020 | Metallinou | G10L 15/02 |
| 2020/0279555 A1* | 9/2020 | Shapiro | G10L 15/22 |
| 2020/0380985 A1* | 12/2020 | Gada | G06F 3/167 |
| 2021/0004443 A1* | 1/2021 | Sapugay | G06F 40/30 |
| 2021/0037067 A1* | 2/2021 | Lee | G10L 15/063 |
| 2021/0056962 A1* | 2/2021 | McMahon | G10L 15/1822 |
| 2021/0082397 A1* | 3/2021 | Kennewick | G06F 3/167 |
| 2021/0097989 A1* | 4/2021 | Lee | G06F 40/295 |
| 2021/0104232 A1* | 4/2021 | Lee | G06N 3/08 |
| 2021/0264909 A1* | 8/2021 | Reece | G06V 10/774 |
| 2021/0264921 A1* | 8/2021 | Reece | G06F 40/169 |
| 2022/0020358 A1 | 1/2022 | Song et al. | |
| 2022/0051463 A1* | 2/2022 | Edwards | G10L 15/22 |
| 2022/0058347 A1* | 2/2022 | Singaraju | H04L 51/02 |
| 2022/0093097 A1 | 3/2022 | Jin et al. | |
| 2022/0171003 A1* | 6/2022 | Kröll | A61B 5/741 |
| 2022/0172722 A1* | 6/2022 | Kim | G10L 15/30 |
| 2023/0267929 A1* | 8/2023 | Park | G10L 15/1815 |
| | | | 704/257 |
| 2024/0185857 A1* | 6/2024 | Burakov | G06F 3/167 |

FOREIGN PATENT DOCUMENTS

| | | |
|---|---|---|
| JP | 2021076818 A | 5/2021 |
| KR | 10-2014-0074229 A | 6/2014 |
| KR | 10-2018-0084392 A | 7/2018 |
| KR | 1020190066116 A | 6/2019 |
| KR | 1020200023518 A | 3/2020 |
| KR | 1020200047853 A | 5/2020 |
| KR | 10-2020-0082137 A | 7/2020 |
| KR | 1020200119531 A | 10/2020 |
| KR | 10-2021-0001082 A | 1/2021 |
| KR | 1020210079004 A | 6/2021 |

OTHER PUBLICATIONS

Communication dated Jan. 8, 2025, issued by the European Patent Office in European Application No. 22927472.5.

* cited by examiner

User: Hi, Bixby. (wake-up) What tourist places are there to visit in Jeju Island? (→ Trip Domain)
Voice assistant: There are many famous beaches in Jeju Island.
...
User: Hi, Bixby. Book hotel available this week. (→ Hotel Domain)
Voice assistant: Let me show you most famous hotels.
...
User: Hi, Bixby. Add trip to my weekend schedule. (→ Calendar Command)
Voice assistant: Okay. Trip is added to your weekend schedule.

FIG. 6A

User: Hi, Bixby. (wake-up) What tourist places are there to visit in Jeju Island? (→ Trip Domain)
Voice assistant: There are many famous beaches in Jeju Island.
...
(auto mic-on)
User: Book hotel available this week. (→ Hotel Domain)
Voice assistant: Let me show you most famous hotels.
...
(auto mic-on)
User: Add trip to my weekend schedule. (→ Calendar Command)
Voice assistant: Okay. Trip is added to your weekend schedule.
(auto mic-on)
User: Did you check out new phone? (→ Dialog falling outside scope of dialog (intent set))
Voice assistant: No response

FIG. 6B

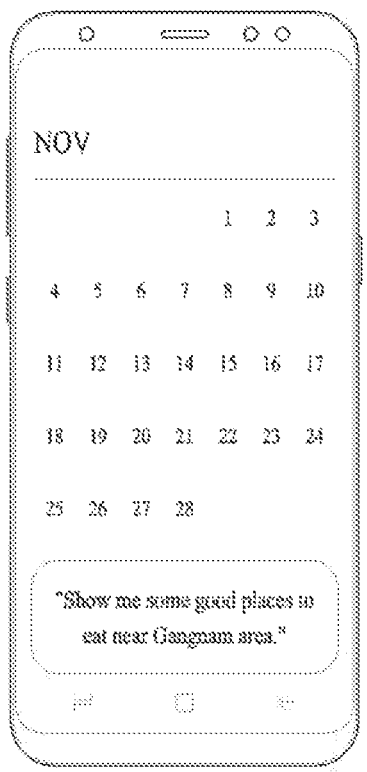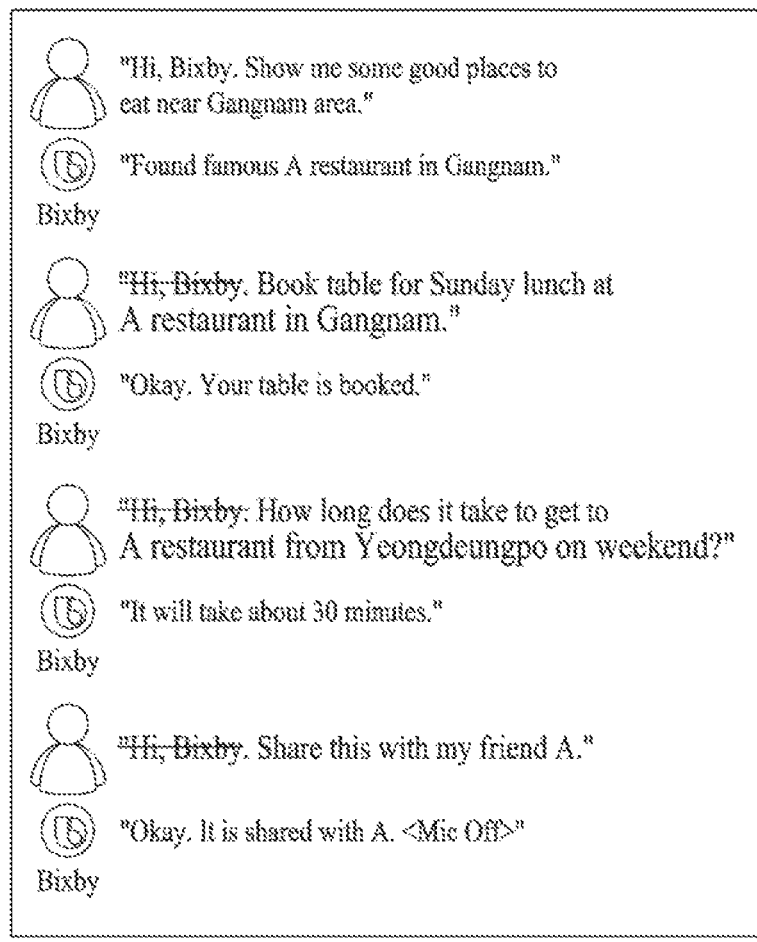
FIG. 9B

ELECTRONIC DEVICE AND UTTERANCE PROCESSING METHOD THEREOF

CROSS-REFERENCE TO RELATED APPLICATIONS

This application is a continuation application of International Application No. PCT/KR2022/020209 designating the United States, filed on Dec. 13, 2022, at the Korean Intellectual Property Receiving Office and claiming priority to Korean Patent Application No. 10-2022-0019892, filed on Feb. 16, 2022, and Korean Patent Application No. 10-2022-0033557, filed on Mar. 17, 2022, at the Korean Intellectual Property Office, the disclosures of which are incorporated by reference herein in their entireties.

BACKGROUND

1. Field

The disclosure relates to an electronic device and an utterance processing method of the electronic device.

2. Description of Related Art

People who use voice assistants expect their voice assistants to carry on a natural dialog and execute functions that they want. However, due to technical limitations, voice assistants do not start processing instructions from a user unless they hear a wakeup word or a wakeup utterance (e.g., "Hi, Bixby"). In addition, voice assistants automatically activate a microphone only if a response from an electronic device is needed.

If a voice assistant only processes utterances including a wakeup word, a user may experience the inconvenience of having to say a wakeup word every time. Although an always-on microphone increases a user's convenience, it may be difficult for a voice assistant to determine whether a user's utterance is unrelated to the voice assistant (e.g., a daily dialog) or instructions spoken to the voice assistant.

SUMMARY

Provided are an electronic device and a method of the electronic device for processing an utterance by understanding an intent of a user without a wakeup word in a voice recognition environment in which continuous utterances are processed.

According to an aspect of the disclosure, an electronic device includes: a microphone configured to receive a first utterance of a user and a second utterance of the user, the second utterance being generated at a later point in time than the first utterance; a memory configured to store instructions; and at least one processor. The at least one processor is configured to execute the instructions to: extract a first domain corresponding to the first utterance and a first intent corresponding to the first utterance based on the first utterance; determine, based on the first domain and the first intent, a first correlation between the first utterance and the second utterance; and determine, based on the first correlation, whether to process the second utterance.

The first utterance may include a wakeup word, and the second utterance does not comprise the wakeup word.

The at least one processor may be further configured to execute the instructions to: based on a result of executing an action corresponding to the first domain and the first intent, generate a context corresponding to the first utterance; and generate, based on the context, an intent set corresponding to the first correlation.

The at least one processor may be further configured to execute the instructions to: determine a second correlation between the context and a second domain corresponding to the second utterance based on one of a degree of relationship between pre-trained domains, and a usage history of the user.

The at least one processor may be further configured to execute the instructions to: extract a second domain corresponding to the second utterance; and determine the first correlation based on a context corresponding to the first utterance and the second domain.

The at least one processor may be further configured to execute the instructions to generate the intent set based on a predefined continuous utterance support policy.

The at least one processor may be further configured to execute the instructions to update the intent set based on a determination of whether to process the second utterance.

The at least one processor may be further configured to execute the instructions to generate the intent set using an intent comprised in the first domain and an intent comprised in a third domain different from the first domain.

The at least one processor may be further configured to execute the instructions to determine whether to activate the microphone based on a determination of whether to process the second utterance.

The at least one processor may be further configured to execute the instructions to: based on determining that the second utterance is to be processed, activate the microphone for a predetermined time; and based on determining that the second utterance is not to be processed, deactivate the microphone.

According to an aspect of the disclosure, an electronic device includes: a microphone configured to receive a first utterance of a user and a second utterance of the user, the second utterance being generated at a later point in time than the first utterance; a memory storing instructions; and at least one processor. The at least one processor is configured to execute the instructions to: receive a correlation list correlated with a first domain corresponding to the first utterance; determine a first correlation between a second domain corresponding to the second utterance and the first utterance based on the correlation list; and determine whether to process the second utterance based on a result of determining the first correlation.

The first utterance may include a wakeup word, and the second utterance does not comprise the wakeup word.

The correlation list may include a plurality of domains or plurality of intents based on the first correlation.

The at least one processor may be further configured to execute the instructions to: based on a result of executing an action corresponding to the first domain and a first intent corresponding to the first utterance, generate a context corresponding to the first utterance; and determine the first correlation based on the correlation list and the context.

The at least one processor may be further configured to execute the instructions to: extract the second domain corresponding to the second utterance; and determine the first correlation based on the correlation list and the second domain.

The at least one processor may be further configured to execute the instructions to update the correlation list based on a determination of whether to process the second utterance.

The correlation list may be generated based on one of a degree of relationship between pre-trained domains, and a usage history of the user.

The at least one processor may be further configured to execute the instructions to determine whether to activate the microphone based on a result of determining whether to process the second utterance.

The at least one processor may be further configured to execute the instructions to: based on determining that the second utterance is to be processed, activate the microphone for a predetermined time; and based on determining that the second utterance is not to be processed, deactivate the microphone.

According to an aspect of the disclosure, a method for utterance processing includes: receiving a first utterance of a user and a second utterance of the user, the second utterance generated at a later point in time than the first utterance; extracting, based on the first utterance, a first domain corresponding to the first utterance and a first intent corresponding to the first utterance; determining, based on the first domain and the first intent, a correlation between the first utterance and the second utterance; and determining, based on the correlation, whether to process the second utterance.

In addition, various effects that may be directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 6A illustrates an example of performing utterance processing using a wakeup word according to an embodiment;

FIG. 6B illustrates an example of performing utterance processing when there is no wakeup word according to an embodiment;

FIG. 9B illustrates an example action of a voice assistant according to the scenario of FIG. 9A according to an embodiment.

DETAILED DESCRIPTION

Figure 1:
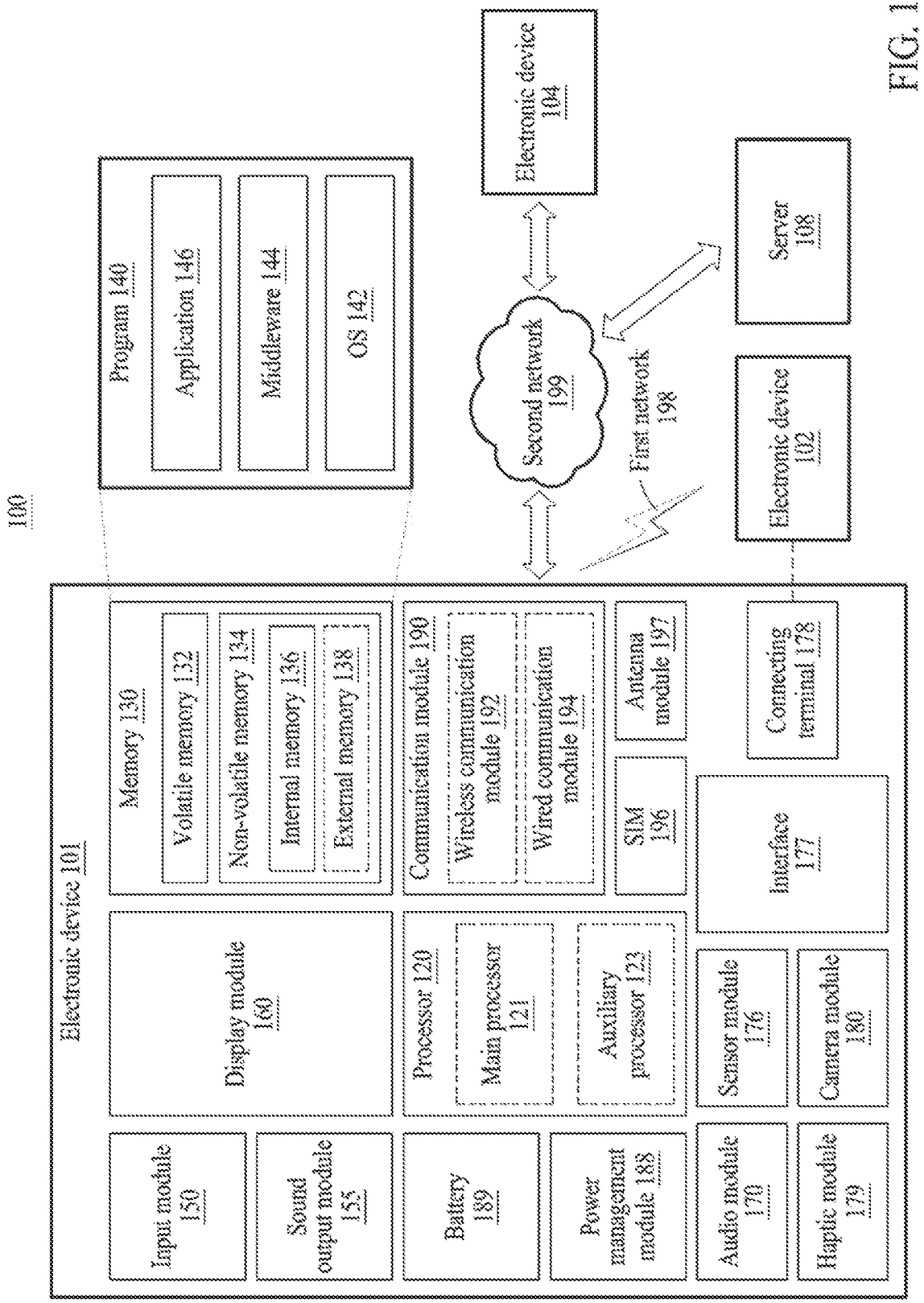
FIG. 1 is a block diagram illustrating an electronic device in a network environment according to an embodiment.

Hereinafter, various embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive state (e.g., sleep) or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated through machine learning. Such learning may be performed by, for example, the electronic device 101 in which AI is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal and vice versa. According to an embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or based on a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "$1^{st}$" and "$2^{nd}$," or "first" and "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented as an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 2:
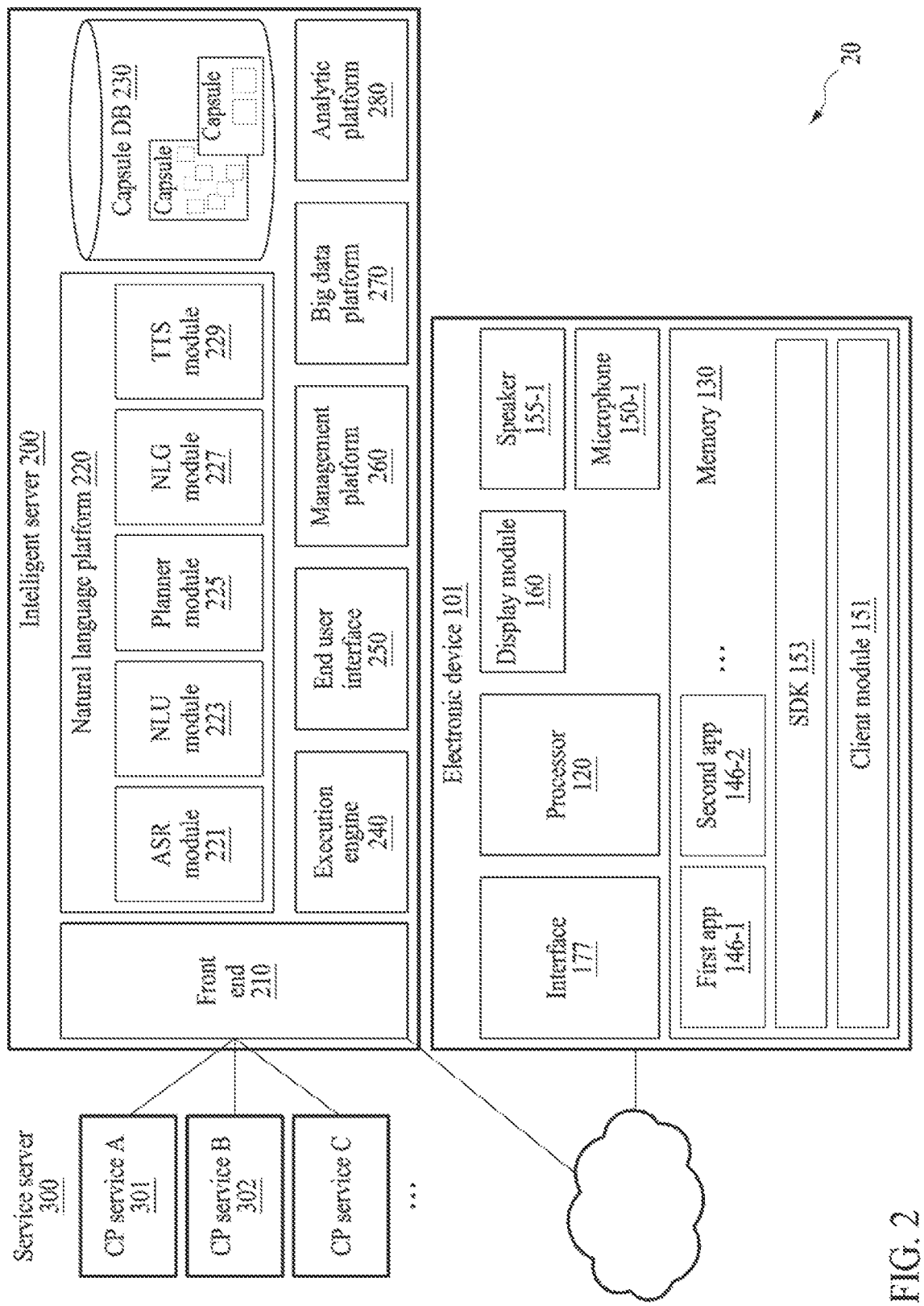
FIG. 2 is a block diagram illustrating an integrated intelligence system according to an embodiment.

FIG. 2 is a block diagram illustrating an integrated intelligence system according to an embodiment.

Referring to FIG. 2, an integrated intelligence system 20 according to an embodiment may include an electronic device (e.g., the electronic device 101 of FIG. 1), an intelligent server 200 (e.g., the server 108 of FIG. 1), and a service server 300 (e.g., the server 108 of FIG. 1).

The electronic device 101 may be a terminal device (or an electronic device) connectable to the Internet, and may be, for example, a mobile phone, a smartphone, a personal digital assistant (PDA), a notebook computer, a TV, a white home appliance, a wearable device, a head-mounted display (HMD), or a smart speaker.

According to the shown embodiment, the electronic device 101 may include a communication interface 177 (e.g., the interface 177 of FIG. 1), a microphone 150-1 (e.g., the input module 150 of FIG. 1), a speaker 155-1 (e.g., the sound output module 155 of FIG. 1), a display module 160 (e.g., the display module 160 of FIG. 1), a memory 130 (e.g., the memory 130 of FIG. 1), or a processor 120 (e.g., the processor 120 of FIG. 1). The components listed above may be operatively or electrically connected to each other.

The communication interface 177 may be connected to an external device and configured to transmit and receive data to and from the external device. The microphone 150-1 may receive a sound (e.g., a user utterance) and convert the sound into an electrical signal. The speaker 155-1 may output the electrical signal as a sound (e.g., a voice).

The display module 160 may be configured to display an image or video. The display module 160 may also display a graphical user interface (GUI) of an app (or an application program) being executed. The display module 160 may receive a touch input through a touch sensor. For example, the display module 160 may receive a text input through a touch sensor in an on-screen keyboard area displayed in the display module 160.

The memory 130 may store a client module 151, a software development kit (SDK) 153, and a plurality of apps 146 (e.g., the application 146 of FIG. 1). The client module 151 and the SDK 153 may configure a framework (or a solution program) for performing general-purpose functions. In addition, the client module 151 or the SDK 153 may configure a framework for processing a user input (e.g., a voice input, a text input, or a touch input).

The plurality of apps 146 stored in the memory 130 may be programs for performing designated functions. The plurality of apps 146 may include a first app 146_1, a second app 146_2, and the like. Each of the plurality of apps 146 may include a plurality of actions for performing a designated function. For example, the apps may include an alarm app, a messaging app, and/or a scheduling app. The plurality of apps 146 may be executed by the processor 120 to sequentially execute at least a portion of the plurality of actions.

The processor 120 may control the overall operation of the electronic device 101. For example, the processor 120 may be electrically connected to the communication interface 177, the microphone 150-1, the speaker 155-1, and the display module 160 to perform a designated operation.

The processor 120 may also perform the designated function by executing the program stored in the memory 130. For example, the processor 120 may execute at least one of the client module 151 or the SDK 153 to perform the following operation for processing a user input. The processor 120 may control the actions of the plurality of apps 146 through, for example, the SDK 153. The following operation which is the operation of the client module 151 or the SDK 153 may be performed by the processor 120.

The client module 151 may receive a user input. For example, the client module 151 may receive a voice signal corresponding to a user utterance sensed through the microphone 150-1. As another example, the client module 151 may receive a touch input sensed through the display module 160. As still another example, the client module 151 may receive a text input sensed through a keyboard or an on-screen keyboard. In addition, the client module 151 may receive various types of user inputs sensed through an input module included in the electronic device 101 or an input module connected to the electronic device 101. The client module 151 may transmit the received user input to the intelligent server 200. The client module 151 may transmit state information of the electronic device 101 together with the received user input to the intelligent server 200. The state information may be, for example, execution state information of an app.

The client module 151 may receive a result corresponding to the received user input. For example, when the intelligent server 200 is capable of calculating a result corresponding to the received user input, the client module 151 may receive the result corresponding to the received user input. The client module 151 may display the received result on the display module 160. Further, the client module 151 may output the received result in an audio form through the speaker 155-1.

The client module 151 may receive a plan corresponding to the received user input. The client module 151 may display results of executing a plurality of actions of an app according to the plan on the display module 160. For example, the client module 151 may sequentially display the results of executing the plurality of actions on the display module 160 and output the results in an audio form through the speaker 155-1. As another example, the electronic device 101 may display only a portion of the results of executing the plurality of actions (e.g., a result of the last action) on the display module 160 and output the portion of the results in an audio form through the speaker 155-1.

According to an embodiment, the client module 151 may receive a request for obtaining information necessary for calculating a result corresponding to the user input from the intelligent server 200. According to an embodiment, the client module 151 may transmit the necessary information to the intelligent server 200 based on the request.

The client module 151 may transmit information on the results of executing the plurality of actions according to the plan to the intelligent server 200. The intelligent server 200 may confirm that the received user input has been correctly processed using the information on the results.

The client module 151 may include a voice recognition module. According to an embodiment, the client module 151 may recognize a voice input for performing a limited function through the voice recognition module. For example, the client module 151 may execute an intelligent app for processing a voice input to perform an organic operation through a designated input (e.g., Wake up!).

The intelligent server 200 may receive information related to a user voice input from the electronic device 101 through a communication network. According to an embodiment, the intelligent server 200 may change data related to the received voice input into text data. According to an embodiment, the intelligent server 200 may generate a plan for performing a task corresponding to the user voice input based on the text data.

According to an embodiment, the plan may be generated by an AI system. The AI system may be a rule-based system or a neural network-based system (e.g., a feedforward neural network (FNN) or a recurrent neural network (RNN)). Alternatively, the AI system may be a combination thereof or other AI systems. According to an embodiment, the plan may be selected from a set of predefined plans or may be generated in real time based on a user request. For example, the AI system may select at least one plan from among the predefined plans.

The intelligent server 200 may transmit a result according to the generated plan to the electronic device 101 or transmit the generated plan to the electronic device 101. According to an embodiment, the electronic device 101 may display the result according to the plan on the display. According to an embodiment, the electronic device 101 may display a result of executing an action according to the plan on the display.

The intelligent server 200 may include a front end 210, a natural language platform 220, a capsule database (DB) 230, an execution engine 240, an end user interface 250, a management platform 260, a big data platform 270, or an analytic platform 280.

The front end 210 may receive the received user input from the electronic device 101. The front end 210 may transmit a response corresponding to the user input.

According to an embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert the voice input received from the electronic device 101 into text data. The NLU module 223 may discern an intent of a user using the text data of the voice input. For example, the NLU module 223 may discern the intent of the user by performing syntactic analysis or semantic analysis on a user input in the form of text data. The NLU module 223 may discern the meaning of a word extracted from the user input using a linguistic feature (e.g., a grammatical element) of a morpheme or phrase, and determine the intent of the user by matching the discerned meaning of the word to an intent.

The planner module 225 may generate a plan using a parameter and the intent determined by the NLU module 223. According to an embodiment, the planner module 225 may determine a plurality of domains required to perform a task based on the determined intent. The planner module 225 may determine a plurality of actions included in each of the plurality of domains determined based on the intent. According to an embodiment, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine relationships between the plurality of actions and the plurality of concepts stepwise (or hierarchically). For example, the planner module 225 may determine an execution order of the plurality of actions determined based on the intent of the user, based on the plurality of concepts. In other words, the planner module 225 may determine the execution order of the plurality of actions based on the parameter required for the execution of the plurality of actions and results output by the execution of the plurality of actions. Accordingly, the planner module 225 may generate a plan including connection information (e.g., ontology) on connections between the plurality of actions and the plurality of concepts. The planner module 225 may generate the plan using information stored in the capsule DB 230 that stores a set of relationships between concepts and actions.

The NLG module 227 may change designated information into a text form. The information changed to the text form may be in the form of a natural language utterance. The TTS module 229 may change information in a text form into information in a voice form.

According to an embodiment, some or all of the functions of the natural language platform 220 may be implemented in the electronic device 101 as well.

The capsule DB 230 may store information on the relationships between the plurality of concepts and actions corresponding to the plurality of domains. A capsule according to an embodiment may include a plurality of action objects (or action information) and concept objects (or concept information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there is a plurality of plans corresponding to the user input. According to an embodiment, the capsule DB 230 may include a follow-up registry that stores information on follow-up actions for suggesting a follow-up action to the user in a designated situation. The follow-up action may include, for example, a follow-up utterance. According to an embodiment, the capsule DB 230 may include a layout registry that stores layout information of information output through the electronic device 101. According to an embodiment, the capsule DB 230 may include a vocabulary registry that stores vocabulary information included in capsule information. According to an embodiment, the capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In an embodiment, the capsule DB 230 may be implemented in the electronic device 101 as well.

The execution engine 240 may calculate a result using the generated plan. The end user interface 250 may transmit the calculated result to the electronic device 101. Accordingly, the electronic device 101 may receive the result and provide the received result to the user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and processing rate (or efficiency) of the intelligent server 200.

The service server 300 may provide a designated service (e.g., food order or hotel reservation) to the electronic device 101. According to an embodiment, the service server 300 may be a server operated by a third party. The service server 300 may provide information to be used for generating a plan corresponding to the received user input to the intelligent server 200. The provided information may be stored in the capsule DB 230. In addition, the service server 300 may provide result information according to the plan to the intelligent server 200.

In the above-described integrated intelligence system 20, the electronic device 101 may provide various intelligent services to the user based on a user input. The user input may include, for example, an input through a physical button, a touch input, or a voice input.

In an embodiment, the electronic device 101 may provide a voice recognition service through an intelligent app (or a speech recognition app) stored therein. In this case, for example, the electronic device 101 may recognize a user utterance or a voice input received through the microphone, and provide a service corresponding to the recognized voice input to the user.

In an embodiment, the electronic device 101 may perform a designated action alone or together with the intelligent server and/or a service server, based on the received voice input. For example, the electronic device 101 may execute an app corresponding to the received voice input and perform a designated action through the executed app.

In an embodiment, when the electronic device 101 provides a service together with the intelligent server 200 and/or the service server, the electronic device 101 may detect a user utterance using the microphone 150-1 and generate a signal (or voice data) corresponding to the detected user utterance. The electronic device 101 may transmit the voice data to the intelligent server 200 using the communication interface 177.

The intelligent server 200 may generate, as a response to the voice input received from the electronic device 101, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input to the execution of the plurality of actions or result values output by the execution of the plurality of actions. The plan may include connection information on connections between the plurality of actions and the plurality of concepts.

The electronic device 101 may receive the response using the communication interface 177. The electronic device 101 may output a voice signal internally generated by the electronic device 101 to the outside using the speaker 155-1, or output an image internally generated by the electronic device 101 to the outside using the display module 160.

Figure 3:
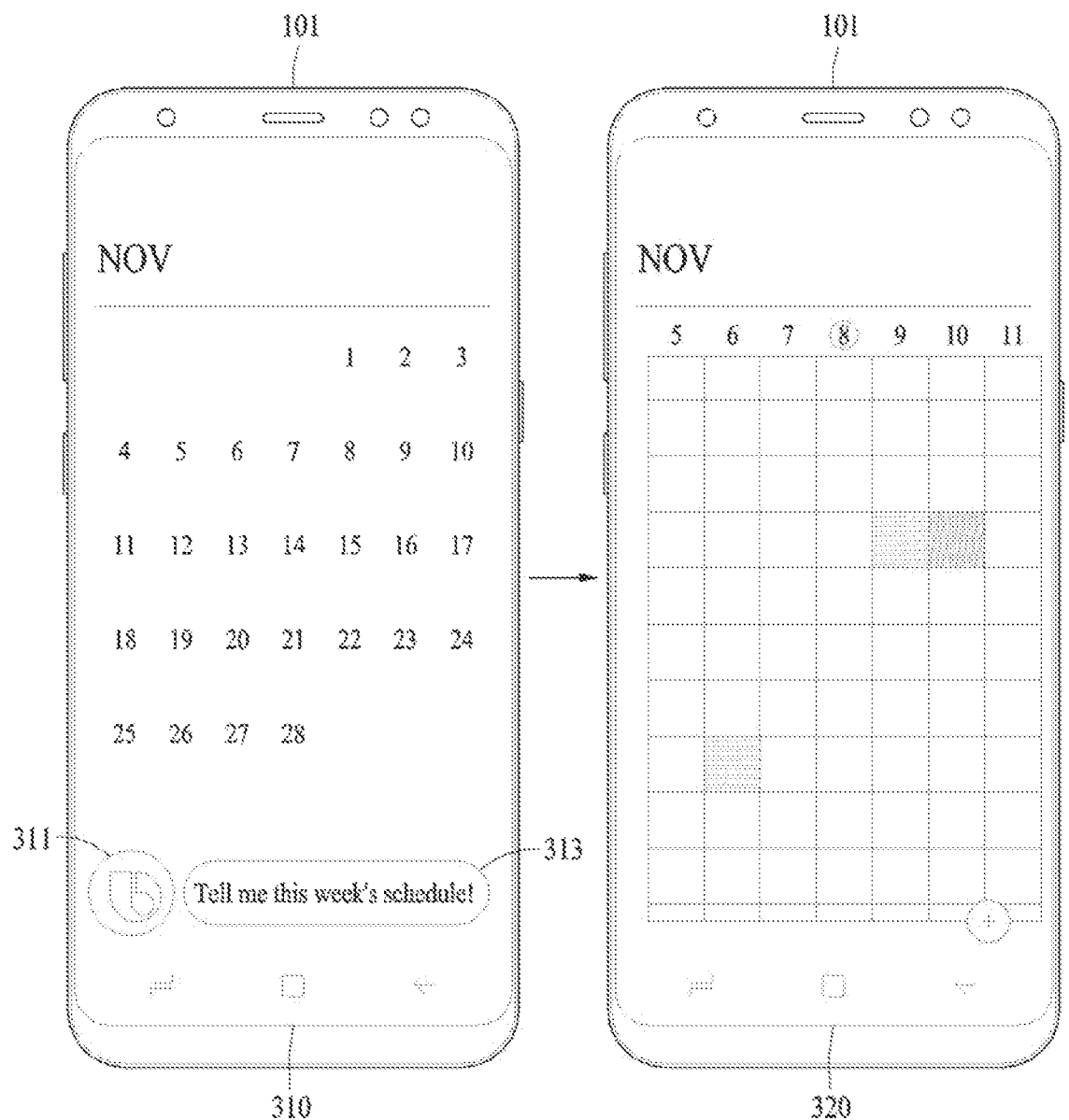
FIG. 3 is a diagram illustrating relationship information between concepts and actions stored in a database (DB) according to an embodiment.

FIG. 3 is a diagram illustrating a form in which relationship information on relationships between concepts and actions is stored in a DB according to an embodiment.

A capsule DB (e.g., the capsule DB 230) of the intelligent server 200 may store capsules in the form of a CAN. The capsule DB may store an action for processing a task corresponding to a voice input of a user and a parameter required for the action in the form of a CAN.

The capsule DB may store a plurality of capsules (e.g., capsule A 401 and capsule B 404) respectively corresponding to a plurality of domains (e.g., applications). According to an embodiment, one capsule (e.g., the capsule A 401) may correspond to one domain (e.g., a location (geo) or an application). Further, the one capsule may correspond to at least one service provider (e.g., CP 1 402 or CP 2 403) for performing a function for a domain related to the capsule. According to an embodiment, one capsule may include at least one action 410 for performing a designated function and at least one concept 420.

The natural language platform 220 may generate a plan for performing a task corresponding to the received voice input using the capsules stored in the capsule DB. For example, the planner module 225 of the natural language platform 220 may generate the plan using the capsules stored in the capsule DB. For example, a plan 407 may be generated using actions 4011 and 4013 and concepts 4012 and 4014 of the capsule A 401 and an action 4041 and a concept 4042 of the capsule B 404.

Figure 4:
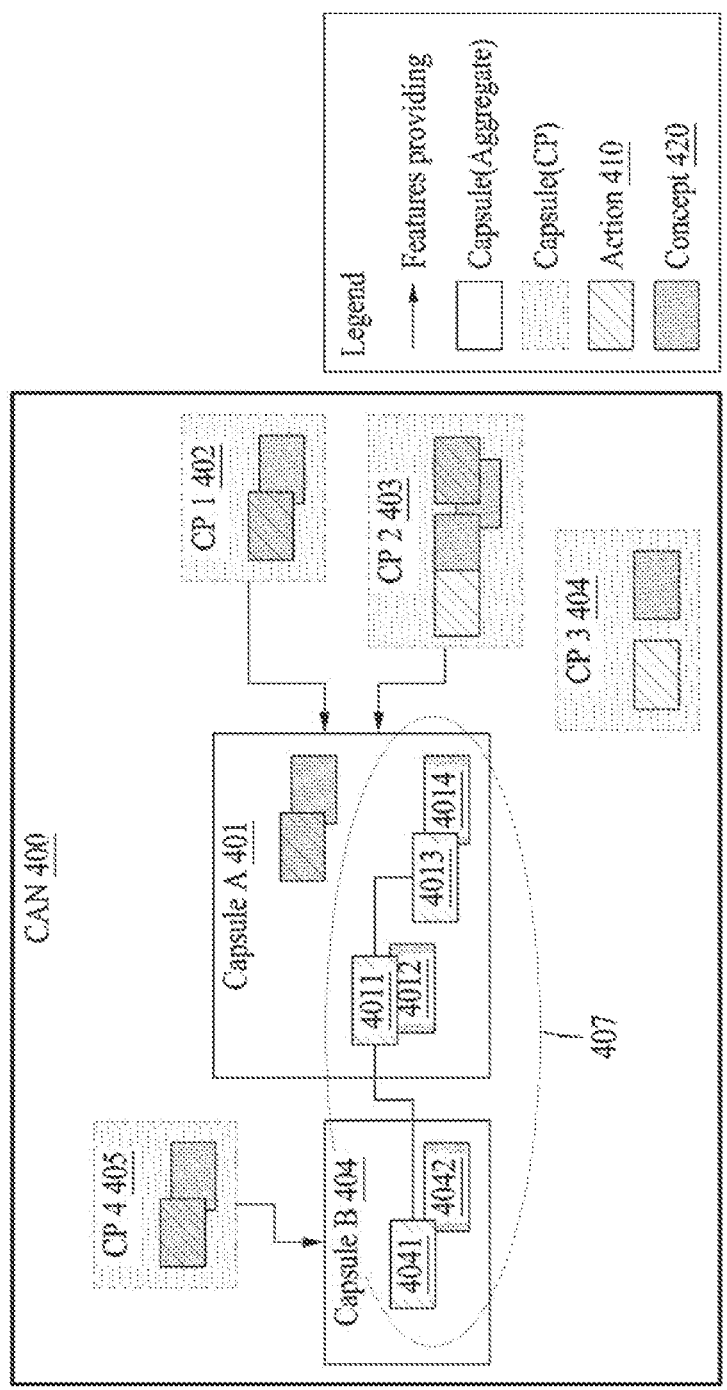
FIG. 4 is a diagram illustrating a screen of an electronic device processing a received voice input through an intelligent app according to an embodiment.

FIG. 4 is a diagram illustrating a screen of an electronic device processing a received voice input through an intelligent app according to an embodiment.

An electronic device (e.g., the electronic device 101 of FIG. 1) may execute an intelligent app to process a user input through an intelligent server (e.g., the intelligent server 200 of FIG. 2).

According to an embodiment, on a screen 310, when a designated voice input (e.g., "Wake up!") is recognized or an input entered through a hardware key (e.g., a dedicated hardware key) is received, the electronic device 101 may execute an intelligent app for processing the voice input. The electronic device 101 may execute the intelligent app, for example, in a state in which a scheduling app is executed. According to an embodiment, the electronic device 101 may display an object (e.g., an icon) 311 corresponding to the intelligent app on the display module 160. According to an embodiment, the electronic device 101 may receive a voice input by a user utterance. For example, the electronic device 101 may receive a voice input of "Tell me this week's schedule!". According to an embodiment, the electronic device 101 may display a user interface (UI) 313 (e.g., an input window) of the intelligent app in which text data of the received voice input is displayed on the display.

According to an embodiment, on a screen 320, the electronic device 101 may display a result corresponding to the received voice input on the display. For example, the electronic device 101 may receive a plan corresponding to the received user input, and display "this week's schedule" on the display module 160 according to the plan.

Figure 5:
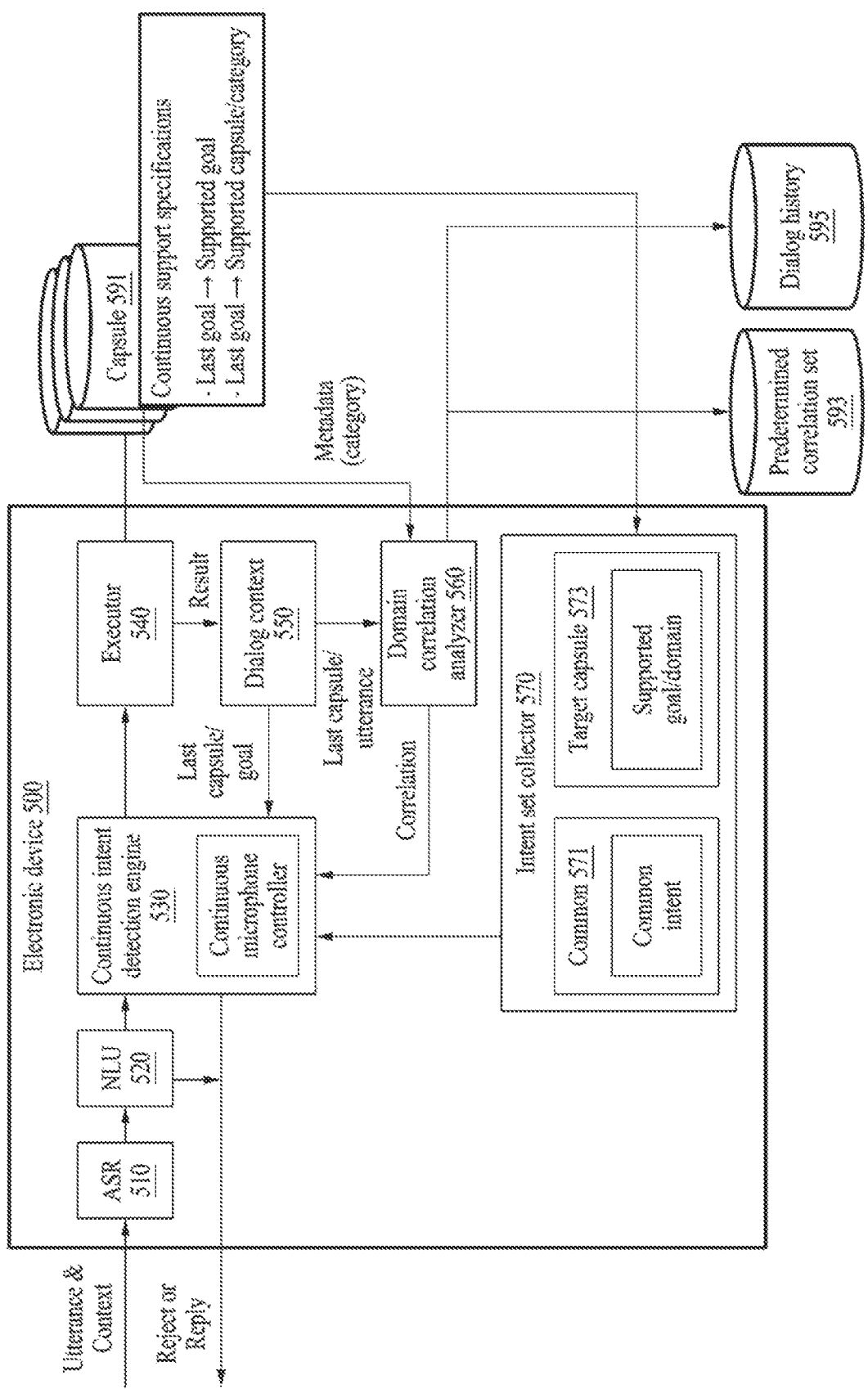
FIG. 5 is a block diagram illustrating an electronic device for performing utterance processing according to an embodiment.

FIG. 5 is a block diagram illustrating an electronic device for performing utterance processing according to an embodiment.

Referring to FIG. 5, according to an embodiment, an electronic device 500 may support a wakeup-less operation. When a plurality of utterances is time-sequentially input, the electronic device 500 may determine whether there is a correlation between a later input additional utterance and a last executed action without a wakeup word and determine whether to process the additional utterance.

According to an embodiment, the electronic device 500 may be implemented in a server (e.g., the server 108 of FIG. 1) or a terminal.

According to an embodiment, the electronic device 500 may process an utterance of a user. The electronic device may generate a processing result by processing the utterance of the user and provide the generated processing result to the user.

According to an embodiment, a microphone (e.g., the microphone 150-1 of FIG. 2) may receive the utterance of the user. The microphone 150-1 may receive a first utterance of the user and a second utterance of a user, the second utterance generated at a later point in time than the first utterance. The first utterance may include a wakeup word. The second utterance may not include the wakeup word. The wakeup word may be any utterance that activates the electronic device 500 to process the utterance of the user. The microphone 150-1 may output the received utterance to a processor (e.g., the processor 120 of FIG. 1).

According to an embodiment, the processor 120 may process data stored in a memory (e.g., the memory 130 of FIG. 1). The processor 120 may execute computer-readable code (e.g., software) stored in the memory 130 and instructions triggered by the processor 120. The processor 120 may be a data processing device implemented by hardware including a circuit having a physical structure to execute desired operations. The desired operations may include, for example, code or instructions included in a program.

According to an embodiment, the hardware-implemented data processing device may include a microprocessor, a CPU, a processor core, a multi-core processor, a multiprocessor, an ASIC, and/or a field-programmable gate array (FPGA).

According to an embodiment, the processor 120 may extract, from the first utterance, a first domain corresponding to the first utterance and a first intent corresponding to the first utterance. A domain may be a group of actions that the user may desire to execute or a category corresponding to a group of actions. The domain may include one or more of intents. An intent may be an action intended by the user. For example, the domain may include a trip domain, a hotel domain, and a calendar domain. The trip domain may include an intent, such as search for a tourist place to visit, a hotel domain may include an intent, such as make a hotel reservation, and a calendar domain may include an intent, such as add or delete a schedule.

According to an embodiment, the processor 120 may determine a correlation between the first utterance and the second utterance based on the first domain and the first intent.

According to an embodiment, the processor 120 may generate a context corresponding to the first utterance based on a result of executing an action corresponding to the first domain and the first intent. The context may include a result of executing an action corresponding to the first utterance and information related to the first domain. The information related to the first domain may include capsule information used to process the first utterance. For example, the first utterance is "What tourist places are there to visit on Jeju Island?", and the context may include the trip domain corresponding to the first utterance and the capsule information used to process the first utterance.

According to an embodiment, the processor 120 may generate an intent set corresponding to a correlation based on the context. The processor 120 may generate the intent set based on a predefined continuous utterance support policy.

According to an embodiment, the predefined continuous utterance support policy may be a criterion of a range (e.g., a domain or a predetermined goal) to be supported as a continuous utterance after a predetermined action corresponding to an utterance for each capsule is executed. For example, after processing the utterance "What tourist places are there to visit on Jeju Island?" the processor 120 may define the predefined continuous utterance support policy in a way that a hotel domain, a weather domain, or a schedule domain is supported as a domain of an additional utterance. The processor 120 may define the predefined continuous utterance support policy on a predetermined goal (e.g., add a schedule or make a hotel reservation) basis. The predefined continuous utterance support policy may be used as a criterion for determining whether content of utterances continuously spoken by the user is consistent with an existing context. The predefined continuous utterance support policy may be used to provide a function for a person in charge of each capsule to establish an appropriate policy.

According to an embodiment, the processor 120 may update the intent set based on a determination of whether to process the second utterance. The processor 120 may generate the intent set using an intent included in the first domain or an intent included in a third domain different from the first domain.

According to an embodiment, the processor 120 may determine whether to process the second utterance based on the correlation between the first utterance and the second utterance. The processor 120 may determine a correlation between the context and a second domain corresponding to the second utterance based on a degree of relationship between pre-trained domains. Alternatively, the processor 120 may determine the correlation between the context and the second domain based on a usage history of the user.

According to an embodiment, the processor 120 may extract the second domain corresponding to the second utterance. The processor 120 may determine the correlation based on the context corresponding to the first utterance and the second domain.

According to an embodiment, the processor 120 may determine whether to activate the microphone 150-1 based on a determination of whether to process the second utterance. Based on a determination that the second utterance is to be processed, the processor 120 may activate the microphone 150-1 for a predetermined time. Based on a determination that the second utterance is not to be processed, the processor 120 may deactivate the microphone 150-1.

According to an embodiment, the processor 120 may receive a correlation list related to the first domain corresponding to the first utterance. The correlation list may include a plurality of domains or intents predefined based on the correlation. The correlation list may be generated based on the degree of relationship between the pre-trained domains. Alternatively, the correlation list may be generated based on the usage history of the user.

According to an embodiment, the processor 120 may determine the correlation between the second domain corresponding to the second utterance and the first utterance based on the correlation list. The processor 120 may generate the context corresponding to the first utterance based on the result of executing an action corresponding to the first domain corresponding to the first utterance and the first intent corresponding to the first utterance.

According to an embodiment, the processor 120 may determine the correlation based on the correlation list and the context. The processor 120 may extract the second domain corresponding to the second utterance. The processor 120 may determine the correlation based on the correlation list and the second domain.

According to an embodiment, the processor 120 may update the correlation list based on a determination of whether to process the second utterance.

According to an embodiment, the processor 120 may determine whether to process the second utterance based on a result of determining the correlation.

According to an embodiment, the processor 120 may include an ASR 510, an NLU 520, a continuous intent detection engine 530, an executor 540, a dialog context module 550, a domain correlation analyzer 560, and an intent set collector 570. A capsule 591 may be implemented inside or outside the electronic device 500 according to an embodiment. A predetermined correlation set 593 and a dialog history 595 may be present inside or outside the electronic device 500 according to an embodiment.

According to an embodiment, the ASR 510 may recognize a voice and convert the voice into text. The NLU 520 may analyze a sentence converted into text to extract a related domain and an intent for an action to be executed.

According to an embodiment, the continuous intent detection engine 530 may determine whether the extracted intent is correlated with content of a last executed action and determine whether a context of a current dialog (e.g., the second utterance) is the same as a context of a previous dialog. For example, if the first utterance is "What tourist places are there to visit on Jeju Island?", and the second utterance of "Show me hotels available this week" is received, the continuous intent detection engine 530 may determine whether a subject of the first utterance and a subject of the second utterance are the same.

According to an embodiment, the continuous intent detection engine 530 may generate a context. The continuous intent detection engine 530 may determine a correlation between utterances based on the context. The context may include a last execution result and information related to a domain. The information related to the domain may include capsule information used to process an utterance. The context may include information on a domain of a previously executed action, the first utterance, and an execution result corresponding to the first utterance. For example, if the first utterance is "What tourist places are there to visit on Jeju Island?", the context may include the trip domain, which is a domain corresponding to the first utterance, and capsule information used to process the utterance.

According to an embodiment, the continuous intent detection engine 530 may generate an intent set. The intent set may include a function and a common intent that may be supported as a continuous utterance at the time of last execution. For example, if the second utterance is "Show me hotels available this week," the continuous intent detection engine 530 may read a previously generated context (e.g., a trip context) and generate the intent set based on a capsule or a domain corresponding to the context. In detail, the continuous intent detection engine 530 may generate the intent set using "restaurant, hotel, or schedule" related to "trip." The continuous intent detection engine 530 may determine whether subjects of utterances are the same based on intents included in the generated intent set.

According to an embodiment, the continuous intent detection engine 530 may include an intent or a domain that may be defined as in-domain according to the continuous utterance support policy defined in a capsule corresponding to an executed action. For example, if the first utterance is an utterance related to "trip," the continuous intent detection engine 530 may determine that "trip" included in the second utterance is the same subject as the first utterance.

According to an embodiment, the continuous intent detection engine 530 may determine that subjects of different domains are the same. The continuous intent detection engine 530 may use different intents in the same domain as the same subject. The continuous intent detection engine 530 may determine that subjects of different domains are the same. For example, a "restaurant" utterance generated after a "trip" utterance is a cross-domain utterance, but the continuous intent detection engine 530 may determine that a subject of the "trip" utterance and a subject of the "restaurant" utterance are the same.

According to an embodiment, the continuous intent detection engine 530 may receive correlation information from the domain correlation analyzer 560. The domain correlation analyzer 560 may use a user utterance history or a degree of relationship between pre-trained domains to determine how high a degree of correlation is between a last context and a domain of an action currently being executed. The domain correlation analyzer 560 may determine a correlation based on pre-trained data or a user history, even if a correlation is not defined every time for each domain. The domain correlation analyzer 560 may determine whether there is a correlation between each word through pretraining data. If it is highly likely that the "hotel" domain and the "schedule" domain are consecutively used by a plurality of users, the domain correlation analyzer 560 may infer a correlation between the two domains. Accordingly, the continuous intent detection engine 530 may determine whether subjects of different domains are the same without predefinition.

According to an embodiment, based on a determination that there is a correlation, a continuous microphone controller may keep the microphone 150-1 activated to continuously receive the utterance of the user. For example, when the second utterance "Show me hotels available this week" is processed, the continuous microphone controller may turn on the microphone to immediately receive an additional utterance because an utterance being input is the same as the first utterance.

According to an embodiment, the continuous intent detection engine 530 may output a transmitted intent to the executor 540 to execute an action corresponding to the transmitted intent.

According to an embodiment, based on a determination that there is no correlation between the second input utterance and the first input utterance, the continuous intent detection engine 530 may deactivate the microphone 150-1 such that the utterance of the user is no longer automatically input. When an utterance not correlated with a last subject is input, the continuous microphone controller may control the microphone 150-1 not to receive an automatic input anymore, signifying that a dialog is to be ended.

According to an embodiment, when an unrelated utterance is input, the continuous intent detection engine 530 may remove a last stored context because there is no need to keep an existing dialog context. The continuous intent detection engine 530 may determine that the user does not intend to speak the unrelated utterance to a voice assistant, and accordingly, the continuous intent detection engine 530 may end a dialog without providing a response to the user or provide a response that is just enough to be recognized by the user.

According to an embodiment, the executor 540 may execute an action corresponding to an intent and store a result of executing the action. How to execute an action according to an intent may be defined in the capsule 591.

According to an embodiment, a dialog context module 550 may store a result of executing an action corresponding to an intent in the executor 540 and a context. The dialog context module 550 may collect and store information, such as information on a domain, an intent, and execution result corresponding to a last executed action that may be used in a next utterance. The stored context may be used to determine a correlation based on an additional utterance being input.

According to an embodiment, the capsule 591 may correspond to an application for each domain. The capsule 591 may learn an executable utterance. The capsule 591 may include intent execution logic. The capsule 591 may define a group of executable candidates (e.g., an intent set) to support a continuous utterance according to a result of executing the action corresponding to the intent. After providing the execution result, the capsule 591 may form the group of candidates with an intent corresponding to an action that may be additionally executed by the user. When domains are not the same, the capsule 591 may define an external domain to support a cross-domain.

According to an embodiment, the intent set collector 570 may include a common module 571 and a target capsule 573. The intent set collector 570 may generate an intent set. The intent set collector 570 may generate an intent set or a domain set of which contexts may be determined to be the same after a predetermined action corresponding to an utterance is executed.

According to an embodiment, continuous utterance support intents and domains defined in a last executed capsule 591 may be as shown in Table 1 and Table 2.

TABLE 1

| Capsule | Last goal | Support goal/Category |
|---|---|---|
| Calendar | Add/View a schedule | Search/Delete a schedule |
| | | Shared capsule (cross capsule) |
| | | Weather (cross category) |
| | Delete a schedule | Add a schedule |

TABLE 2

| Capsule | Last goal | Support goal/Category |
|---|---|---|
| Music | *(All goals) | Control media (cross category) e.g., "next song," "previous song" |

According to an embodiment, a common intent that may be used in an arbitrary situation may be as shown in Table 3.

TABLE 3

| Source | Continuous intent candidates |
|---|---|
| Common (system support) | Cancel |
| | Read again |

According to an embodiment, Table 1, Table 2, and Table 3 may show examples of intent candidate groups when an action corresponding to "View a schedule" is executed. A candidate group may be formed by combining a candidate group defined in a calendar capsule and commonly used candidate groups. When an intent or a domain of an utterance input by a wakeup-less method is present in any of candidate groups, such as the candidate groups shown in Table 1, Table 2, and Table 3, the executor 540 may execute an action corresponding to the intent of the utterance. However, when the intent or domain is not present in any of the candidate groups, the executor 540 may ignore the intent of the utterance.

FIG. 6A illustrates an example of utterance processing using a wakeup word according to an embodiment, and FIG. 6B illustrates an example of utterance processing when there is no wakeup word according to an embodiment.

According to an embodiment, referring to FIGS. 6A and 6B, a processor (e.g., the processor 120 of FIG. 1) may determine whether an utterance input by a user is meaningful to assist a voice assistant to process a wakeup-less utterance.

According to an embodiment, the processor 120 may execute a predetermined action corresponding to the utterance of the user and then wait for an additional utterance of the user while keeping a microphone (e.g., the microphone 150-1 of FIG. 2) activated (i.e., turned on). Based on receiving the additional utterance of the user, the processor 120 may determine whether the additional utterance is correlated with a last action to execute an additional action or ignore the additional utterance.

According to an embodiment, when an utterance includes no wakeup word, the processor 120 may determine whether to execute an action corresponding to an additionally input utterance. In the example of FIG. 6A, after a response to the utterance is output, a wakeup word may be included in order for the additional utterance to be processed. The microphone 150-1 may not be automatically turned on because the processor may not be able to determine whether an additional utterance spoken by the user after the user hears a result of processing a first utterance is intended for an action of a voice assistant. Therefore, the user may always need to say a wakeup word, so a dialog may not be natural.

According to an embodiment, as shown in the example of FIG. 6B, the processor 120 may automatically turn on the microphone 150-1 after producing a response to a first utterance (e.g., a first utterance), receive a second utterance (e.g., a second utterance) spoken by the user, and then identify whether the second utterance is correlated with a result obtained by producing the response and provide a result of processing the additional utterance. Based on there being no correlation between the first utterance and the second utterance, the processor 120 may produce no response anymore and naturally end the dialog. Through this process, the processor 120 may provide a continuous dialog to the user and naturally end the dialog.

According to an embodiment, the processor 120 may determine an intended goal of the user through an utterance input of the user. The processor 120 may generate an intent set including different related intents based on the determined intended goal and designate a scope of a dialog of the user.

According to an embodiment, when a follow-up utterance of the user falls within the designated scope of the dialog, the processor 120 may process an intent that falls within the scope even if no wakeup word is input.

According to an embodiment, the processor 120 may set an intent set again based on the processed intended goal.

According to an embodiment, when there is no utterance input by the user for a predetermined time or an utterance of the user falls outside the designated scope of the dialog, the processor 120 may process the utterance of the user using the wakeup word.

Figure 7:
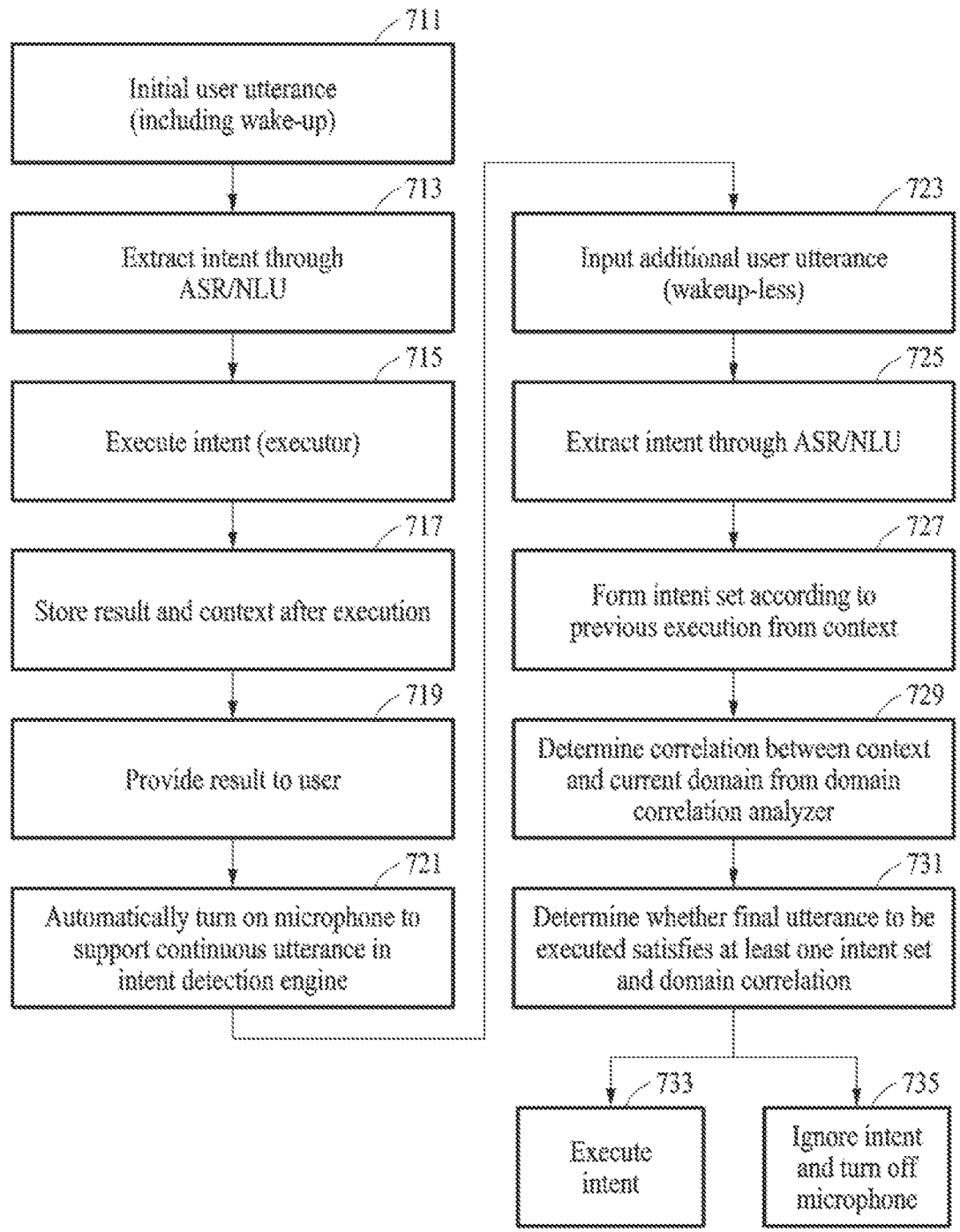
FIG. 7 is a flowchart of a method of processing an additional utterance according to an embodiment.

FIG. 7 is a flowchart of an example of processing an additional utterance according to an embodiment.

According to an embodiment, referring to FIG. 7, a microphone (e.g., the microphone 150-1 of FIG. 2) may receive an initial utterance (e.g., a first utterance) of a user (711). The initial utterance may include a wakeup word. A processor (e.g., the processor 120 of FIG. 1) may extract an intent from the utterance through ASR (e.g., the ASR 510 of FIG. 5) and/or NLU (e.g., the NLU 520 of FIG. 5) (713).

According to an embodiment, the processor 120 may perform an action based on the extracted intent through an executor (e.g., the executor 540 of FIG. 5) (715). A definition of an action to be performed may be included in a capsule (e.g., the capsule 591 of FIG. 5).

According to an embodiment, the processor 120 may store a result of executing an action using the dialog context module 550 and a context (e.g., a context) to process an additional utterance (717). The processor 120 may provide an execution result or a dialog to the user. The execution result may be provided through a display (e.g., the display module 160 of FIG. 1) (719).

According to an embodiment, the processor 120 may automatically turn on the microphone through an intent detection engine (e.g., the continuous intent detection engine 530 of FIG. 5) to support a continuous utterance to support a case in which the additional utterance is a wakeup-less utterance (721).

According to an embodiment, the microphone 150-1 may receive the additional utterance of the user. The additional utterance may be the wakeup-less utterance (e.g., an utterance that does not include a wakeup word) (723).

According to an embodiment, the processor 120 may extract an intent from the additional utterance through the ASR 510 and/or the NLU 520 (725). The processor 120 may generate an intent set based on a result of executing an action corresponding to the initial utterance (e.g., the first utterance) included in the context (727).

According to an embodiment, the processor 120 may generate the intent set with continuously executable function (e.g., intent) candidates defined in a capsule of a domain of a current utterance based on executable intents in a same domain or cross-domain intent candidates. Common executable functions may include cancel and repeat.

According to an embodiment, the processor 120 may determine a correlation between the context and a current domain using a domain correlation analyzer (e.g., the domain correlation analyzer 560 of FIG. 5) (729). The processor 120 may automatically build a related context based on a usage pattern or a usage history of the user even if a context is not present in the intent set.

According to an embodiment, the processor 120 may determine whether there is a correlation using the intent set and a domain correlation. If the intent of the additional utterance is included in the intent set or the domain of the additional utterance has a correlation, the processor 120 may determine that there is a correlation (731). Otherwise, the processor 120 may determine that the additional utterance is to be ignored.

According to an embodiment, based on a final determination that the intent or the domain of the current utterance (e.g., the second utterance) is correlated with the initial utterance (e.g., the first utterance), the processor 120 may execute an action corresponding to the intent of the current utterance (733).

According to an embodiment, based on the final determination that the intent or the domain of the current utterance is not correlated with the initial utterance, the processor 120 may ignore the intent of the current utterance and deactivate the microphone 150-1 (735).

Figure 8A:
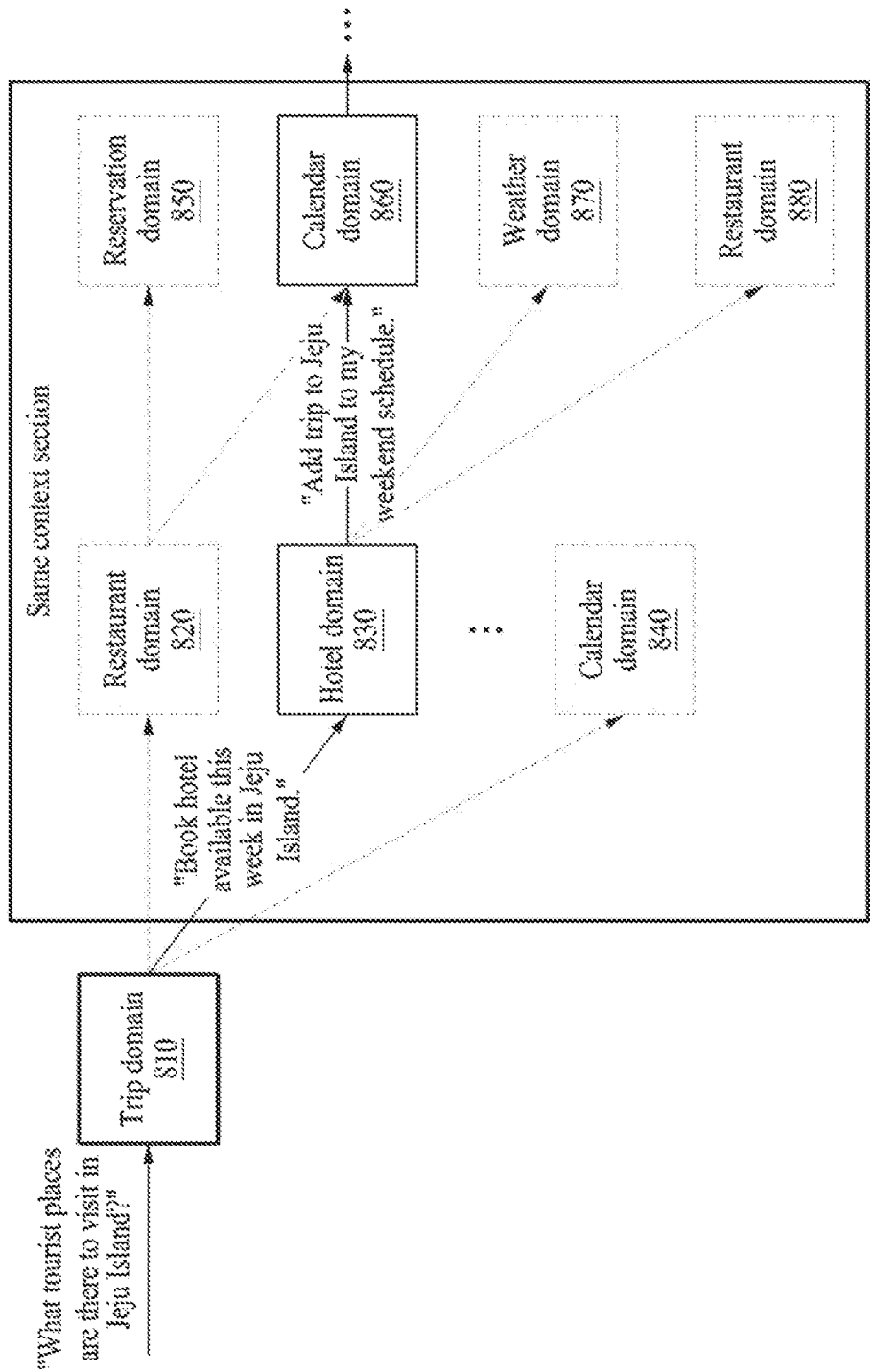
FIG. 8A illustrates an example of an utterance processing scenario according to an embodiment.
Figure 8B:
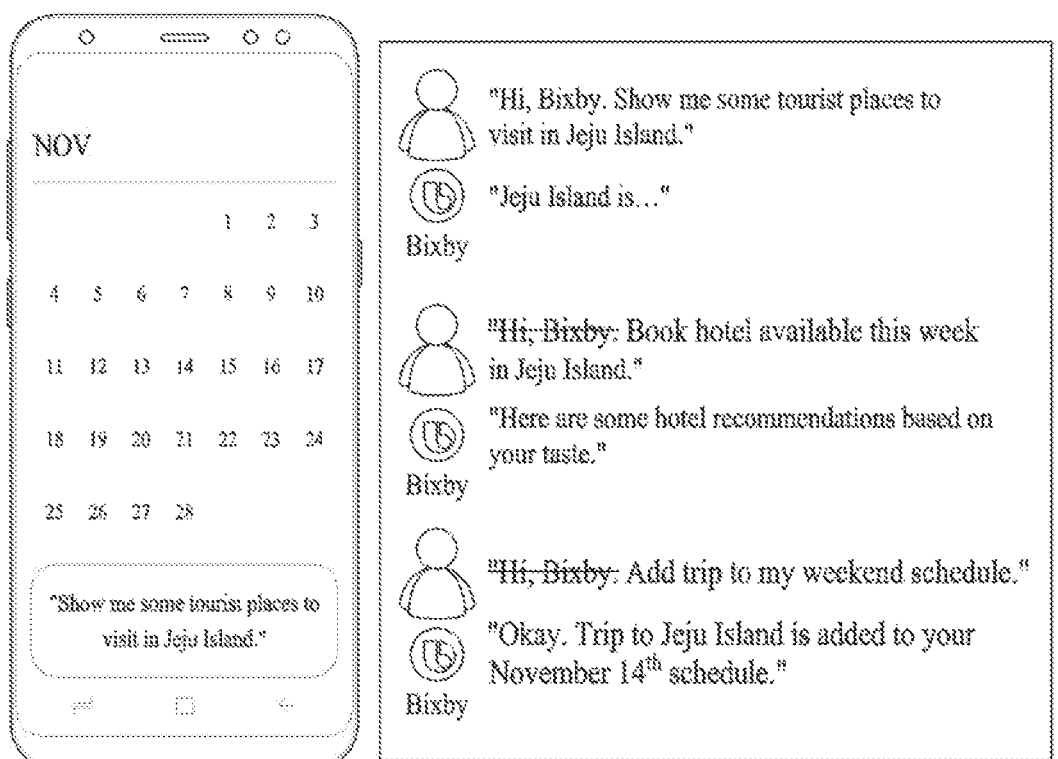
FIG. 8B illustrates an example action of a voice assistant according to the scenario of FIG. 8A according to an embodiment.

FIG. 8A illustrates an example of an utterance processing scenario according to an embodiment, and FIG. 8B illustrates an example of an action of a voice assistant according to the scenario of FIG. 8A according to an embodiment.

According to an embodiment, referring to FIGS. 8A and 8B, a processor (e.g., the processor 120 of FIG. 1) may determine an intent set to determine whether a subject of each domain is the same. In the example of FIG. 8A, when an initial utterance is a trip domain 810, candidate domains of which subjects may be determined to be the same may be a restaurant domain 820, a hotel domain 830, and/or a calendar domain 840. A candidate domain may have an intent set corresponding to the candidate domain. The processor 120 may generate a new intent set corresponding to a domain based on an utterance of a user. The processor 120 may process an utterance without a wakeup word based on determining there is a same context across a plurality of subjects based on the generated intent set.

According to an embodiment, based on executing an action corresponding to the trip domain 810, the processor 120 may set correlated domains in the trip domain 810. As shown in the example of FIG. 8A, the restaurant domain 820, the hotel domain 830, and the calendar domain 840 are set as the correlated domains, and the processor 120 may receive a continuous utterance including the correlated domains and recognize that subjects of the utterances are the same. The processor 120 may set a reservation domain 850 and a calendar domain 860 as correlated domains of the restaurant domain 820 and group them into an intent set. The processor 120 may set the calendar domain 860, a weather domain 870, and the restaurant domain 880 as correlated domains of the hotel domain 830 and group them into an intent set.

According to an embodiment, after initially receiving a wakeup word of the user, whenever the processor 120 receives an additional utterance, the processor 120 may form a group of candidates that may be the same in context and have a natural dialog regarding multiple domains with the user without receiving the wakeup word for the additional utterance.

According to an embodiment, when an utterance related to tourist places on Jeju Island is received from the user, an action corresponding to the trip domain 810 is executed. The processor 120 may group the restaurant domain 820, the hotel domain 830, and the calendar domain 840 into an intent set to determine subjects that are the same and are correlated with the trip domain 810. The processor 120 may activate a microphone (e.g., the microphone 150-1 of FIG. 2) to prepare to receive an additional utterance. The processor 120 may receive the additional utterance of the user through the microphone 150-1. When the additional utterance is in the hotel domain 830 included in the intent set, the processor 120 may determine that the additional utterance has the same subject and execute an action corresponding to the utterance.

Figure 9A:
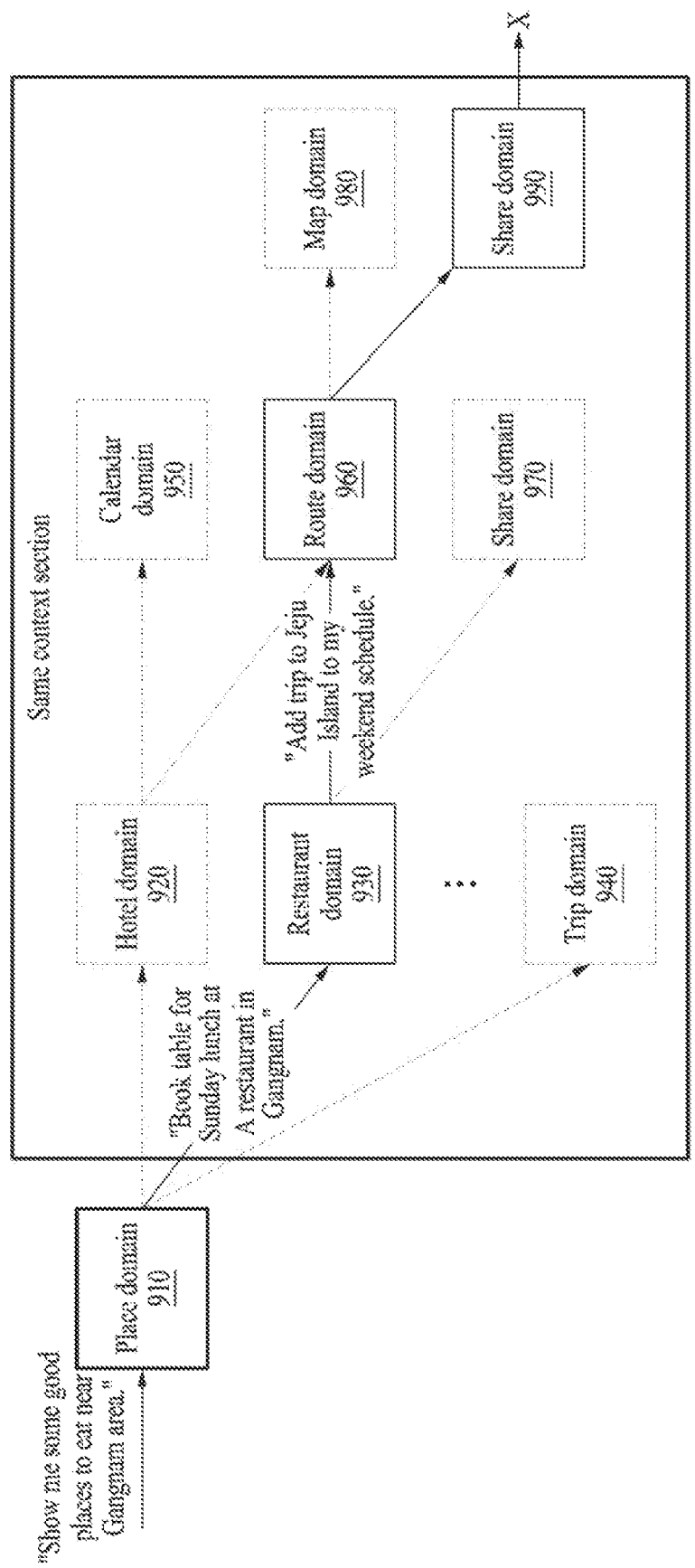
FIG. 9A illustrates an example of an utterance processing scenario according to an embodiment.

FIG. 9A illustrates an example of an utterance processing scenario according to an embodiment, and FIG. 9B illustrates an example of an action of a voice assistant according to the scenario of FIG. 9A according to an embodiment.

According to an embodiment, referring to FIGS. 9A and 9B, a processor (e.g., the processor 120 of FIG. 1) may not directly generate an intent set corresponding to each domain but generate an intent set using a domain correlation.

According to an embodiment, the processor 120 may generate an intent set by extracting a plurality of domains determined to have a same subject from a domain for which an action was previously executed using data on a pretrained correlation between words or data obtained by analyzing a usage pattern of a user.

According to an embodiment, when a domain of an initial utterance is a place domain 910, the processor 120 may generate an intent set using a hotel domain 920, a restaurant domain 930, and a trip domain 940 based on the usage pattern of the user or the pretrained correlation. The processor 120 may generate an intent set to support a route domain 960 and a share domain 970 as a domain having a same subject by considering a correlation with the restaurant domain 920. The processor 120 may generate an intent set using the calendar domain 950 and the route domain 960 by considering a correlation with the hotel domain 920. The processor 120 may generate an intent set using a map domain 980 and a share domain 990 by considering a correlation with the route domain 960.

According to an embodiment, because the share domain 990, which is a last domain, has no correlated domain, the processor 120 may not generate an intent set to immediately end a dialog.

According to an embodiment, the processor 120 may support a natural dialog without a wakeup word for the same subject through the above-described operations. As illustrated in FIGS. 9A and 9B, the processor 120 may automatically support the share domain frequently used by users as a domain having the same subject after making a restaurant reservation. Through this process, the user may request and execute a sharing-related utterance without the wakeup word.

According to an embodiment, when the last domain is the share domain 990, because there is no continuous domain to additionally support, the processor 120 may immediately deactivate a microphone (e.g., the microphone 150-1 of FIG. 2), provide a last response, and end a dialog. The processor 120 may dynamically form an intent set according to a domain.

Figure 10:
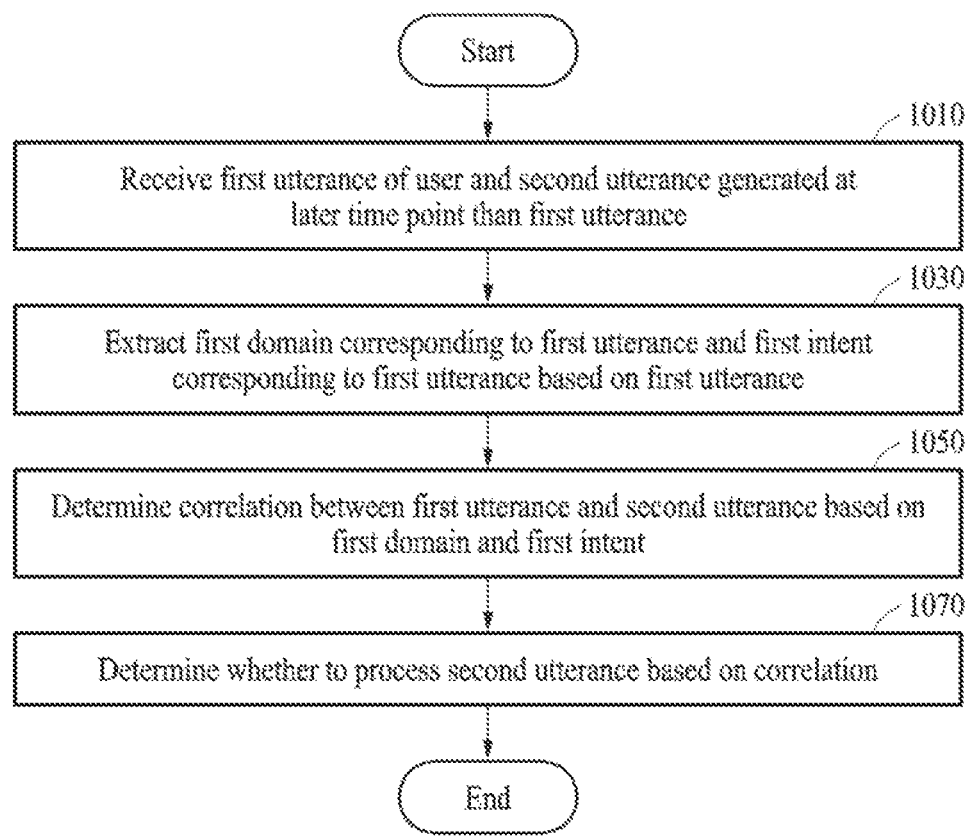
FIG. 10 is a flowchart illustrating an operation of an electronic device according to an embodiment.

FIG. 10 is a flowchart illustrating an operation of an electronic device according to an embodiment.

According to an embodiment, referring to FIG. 10, a microphone (e.g., the microphone 150-1 of FIG. 2) may receive a first utterance of a user and a second utterance of the user, the second utterance generated at a later point in time than the first utterance (1010). The first utterance may include a wakeup word. The second utterance may not include the wakeup word.

According to an embodiment, a processor (e.g., the processor 120 of FIG. 1) may extract, from the first utterance, a first domain corresponding to the first utterance and a first intent corresponding to the first utterance (1030).

According to an embodiment, the processor 120 may determine a correlation between the first utterance and the second utterance based on the first domain and the first intent (1050). According to an embodiment, the processor 120 may generate a context corresponding to the first utterance based on a result of executing an action corresponding to the first domain and the first intent.

According to an embodiment, the processor 120 may generate an intent set corresponding to the correlation based on the context. The processor 120 may generate the intent set based on a predefined continuous utterance support policy. The processor 120 may update the intent set based on a determination of whether to process the second utterance. The processor 120 may generate the intent set using an intent included in the first domain or an intent included in a third domain different from the first domain.

According to an embodiment, the processor 120 may determine a correlation between the context and a second domain corresponding to the second utterance based on a degree of relationship between pre-trained domains. Alternatively, the processor 120 may determine the correlation between the context and the second domain based on a usage history of the user.

According to an embodiment, the processor 120 may determine whether to process the second utterance based on the correlation between the first utterance and the second utterance (1070). According to an embodiment, the processor 120 may extract the second domain corresponding to the second utterance. The processor 120 may determine the correlation based on the context corresponding to the first utterance and the second domain.

According to an embodiment, the processor 120 may determine whether to activate the microphone 150-1 based on a determination of whether to process the second utterance. Based on a determination that the second utterance is to be processed, the processor 120 may activate the microphone 150-1 for a predetermined time. Based on a determination that the second utterance is not to be processed, the processor 120 may deactivate the microphone 150-1.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein may be practiced with modification within the scope of the disclosure as described herein.

What is claimed is:

1. An electronic device comprising:
a microphone configured to receive a first utterance of a user and a second utterance of the user, the first utterance comprising a wakeup word and additional words after the wakeup word, and the second utterance being generated at a later point in time than the first utterance;
a memory configured to store instructions; and
at least one processor configured to execute the instructions to:
extract a first domain corresponding to the first utterance and a first intent corresponding to the first utterance based on the first utterance;
execute an action corresponding to the additional words of the first utterance;
provide a response to the user regarding a result of executing the action corresponding to the additional words of the first utterance;
determine, based on the first domain and the first intent, a first correlation between the first utterance and the second utterance; and
determine, based on the first correlation, whether to process the second utterance,
wherein the second utterance does not comprise the wakeup word, and the second utterance is received from the user after the response is provided.

2. The electronic device of claim 1, wherein the at least one processor is further configured to execute the instructions to:
based on a result of executing an action corresponding to the first domain and the first intent, generate a context corresponding to the first utterance; and
generate, based on the context, an intent set corresponding to the first correlation.

3. The electronic device of claim 2, wherein the at least one processor is further configured to execute the instructions to:
determine a second correlation between the context and a second domain corresponding to the second utterance based on one of a degree of relationship between pre-trained domains or a usage history of the user.

4. The electronic device of claim 1, wherein the at least one processor is further configured to execute the instructions to:
extract a second domain corresponding to the second utterance; and
determine the first correlation based on a context corresponding to the first utterance and the second domain.

5. The electronic device of claim 2, wherein the at least one processor is further configured to execute the instructions to generate the intent set based on a predefined continuous utterance support policy.

6. The electronic device of claim 2, wherein the at least one processor is further configured to execute the instructions to update the intent set based on a determination of whether to process the second utterance.

7. The electronic device of claim 2, wherein the at least one processor is further configured to execute the instructions to generate the intent set using an intent comprised in the first domain and an intent comprised in a third domain different from the first domain.

8. The electronic device of claim 1, wherein the at least one processor is further configured to execute the instructions to determine whether to activate the microphone based on a determination of whether to process the second utterance.

9. The electronic device of claim 1, wherein the at least one processor is further configured to execute the instructions to:
based on determining that the second utterance is to be processed, activate the microphone for a predetermined time; and
based on determining that the second utterance is not to be processed, deactivate the microphone.

10. An electronic device comprising:
a microphone configured to receive a first utterance of a user and a second utterance of the user, the first utterance comprising a wakeup word and additional words after the wakeup word, and the second utterance being generated at a later point in time than the first utterance;
a memory storing instructions; and
at least one processor configured to execute the instructions to:
execute an action corresponding to the additional words of the first utterance;
provide a response to the user regarding a result of executing the action corresponding to the additional words of the first utterance;
receive a correlation list correlated with a first domain corresponding to the first utterance;

determine a first correlation between a second domain corresponding to the second utterance and the first utterance based on the correlation list; and determine whether to process the second utterance based on a result of determining the first correlation, wherein the second utterance does not comprise the wakeup word, and the second utterance is received from the user after the response is provided.

11. The electronic device of claim 10, wherein the correlation list comprises a plurality of domains or plurality of intents based on the first correlation.

12. The electronic device of claim 10, wherein the at least one processor is further configured to execute the instructions to:

based on a result of executing an action corresponding to the first domain and a first intent corresponding to the first utterance, generate a context corresponding to the first utterance; and determine the first correlation based on the correlation list and the context.

13. The electronic device of claim 10, wherein the at least one processor is further configured to execute the instructions to:

extract the second domain corresponding to the second utterance; and determine the first correlation based on the correlation list and the second domain.

14. The electronic device of claim 10, wherein the at least one processor is further configured to execute the instructions to update the correlation list based on a determination of whether to process the second utterance.

15. The electronic device of claim 10, wherein the correlation list is generated based on one of a degree of relationship between pre-trained domains or a usage history of the user.

16. The electronic device of claim 10, wherein the at least one processor is further configured to execute the instructions to determine whether to activate the microphone based on a result of determining whether to process the second utterance.

17. The electronic device of claim 10, wherein the at least one processor is further configured to execute the instructions to:

based on determining that the second utterance is to be processed, activate the microphone for a predetermined time; and based on determining that the second utterance is not to be processed, deactivate the microphone.

18. An utterance processing method of an electronic device, the utterance processing method comprising:

receiving a first utterance of a user and a second utterance of the user, the first utterance comprising a wakeup word and additional words after the wakeup word, and the second utterance being generated at a later point in time than the first utterance;

extracting, based on the first utterance, a first domain corresponding to the first utterance and a first intent corresponding to the first utterance;

executing an action corresponding to the additional words of the first utterance;

providing a response to the user regarding a result of executing the action corresponding to the additional words of the first utterance;

determining, based on the first domain and the first intent, a correlation between the first utterance and the second utterance; and determining, based on the correlation, whether to process the second utterance, wherein the second utterance does not comprise the wakeup word, and the second utterance is received from the user after the response is provided.

* * * * *